United States Patent [19]

Ruetz

[11] Patent Number: 4,865,332

[45] Date of Patent: Sep. 12, 1989

[54] SEALING ARRANGEMENT BETWEEN A SHAFT AND A HOUSING OF A FLUID FLOW ENGINE

[75] Inventor: Georg Ruetz, Immenstaad, Fed. Rep. of Germany

[73] Assignee: MTU Motoren- und Turbinen-Union Friedrichshafen GmbH, Friedrichshafen, Fed. Rep. of Germany

[21] Appl. No.: 267,280

[22] Filed: Nov. 4, 1988

[30] Foreign Application Priority Data

Nov. 7, 1987 [DE] Fed. Rep. of Germany ....... 3737932

[51] Int. Cl.$^4$ .......................... F16J 15/34; F16J 15/46
[52] U.S. Cl. ......................................... 277/27; 277/15; 277/59; 277/65; 277/83; 277/173
[58] Field of Search ....................... 277/15, 27, 59, 65, 277/83, 173, 174, 176

[56] References Cited

U.S. PATENT DOCUMENTS

| | | | |
|---|---|---|---|
| 3,462,159 | 8/1969 | Baumann et al. | 277/27 |
| 3,588,125 | 6/1971 | Mastromatteo | 277/59 X |
| 3,716,245 | 2/1973 | Turolla | 277/176 |
| 4,462,601 | 7/1984 | Skoog | 277/27 |
| 4,560,173 | 12/1985 | Adams et al. | 277/15 |

*Primary Examiner*—Robert S. Ward
*Attorney, Agent, or Firm*—Barnes & Thornburg

[57] ABSTRACT

A sealing arrangement between a shaft and a housing of a fluid flow engine consists of a blocking gas space acted upon with blocking gas, which is delimited by two sealing rings guided in annular grooves of the shaft and radially sealingly abutting at the shaft through-bore. In order to avoid operation-endangering wear of the sealing rings in case of failure of the blocking gas supply, the shaft through-bore is constructed with three diameter regions mutually offset by right angle steps. The steps form each an axial support for the coordinated sealing ring which comes into action when a permissive initial wear has occurred at the sealing ring.

5 Claims, 1 Drawing Sheet

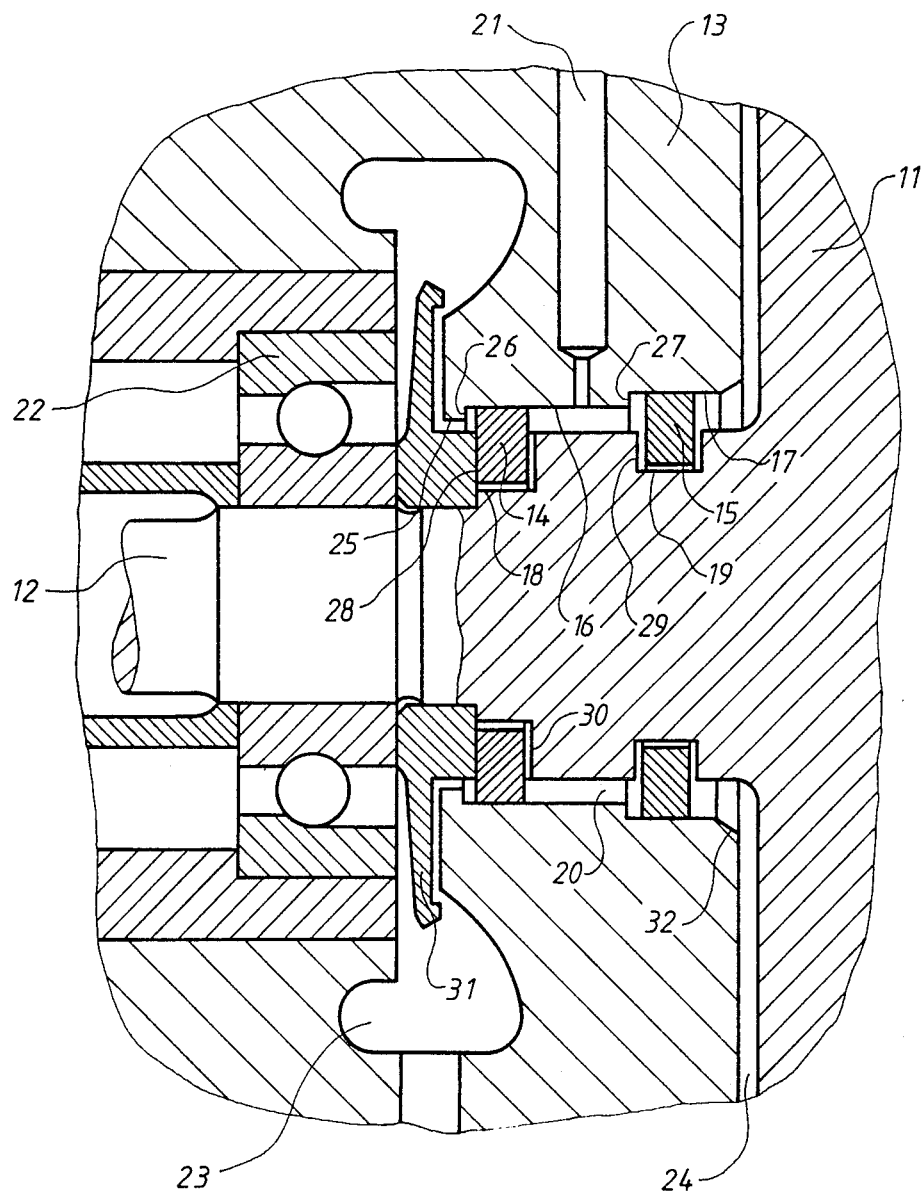

SEALING ARRANGEMENT BETWEEN A SHAFT AND A HOUSING OF A FLUID FLOW ENGINE

BACKGROUND AND SUMMARY OF THE INVENTION

The present invention relates to a sealing arrangement between the shaft carrying at least a rotor and the housing of a fluid flow engine or jet engine comprising two sealing places arranged at an axial distance from one another which delimit a blocking gas space acted upon with blocking gas and includes at least one sealing place consisting of a sealing ring inserted into an annular groove of the shaft and radially sealingly abutting against the shaft through-bore.

The purpose of such a sealing arrangement, in which the sealing ring that does not move in the circumferential direction, results in conjunction with the coordinated annular groove in the rotating shaft in a labyrinth seal, is to prevent lubricating oil losses out of the bearing places of the shaft and the overflow of hot gases out of the rotor space into the bearing places.

A sealing arrangement of the aforementioned type is disclosed in the DE 32 19 127 C2 in which one sealing ring is pressed by the excess pressure in the blocking gas space against the lateral flank of its annular groove opposite the rotor. After an initial wear at the sealing ring with respect to the annular groove-lateral flank, the sealing ring is displaced against the right angle step in the bore for the passage of the shaft. The wear at the sealing ring thereby comes to a standstill.

The sealing ring delimiting the blocking gas space in the direction to the rotor space is in the normal case axially in equilibrium between the pressure in the blocking gas space and the gas pressure in the rotor space without contact of one of the lateral flanks of the annular groove so that no annular wear occurs.

In case of a failure or defective functioning of the blocking gas pressure supply, the sealing ring adjacent the rotor space is displaced by the gas pressure prevailing in the rotor space axially toward the blocking gas space and abuts at the lateral flank of the annular groove. As an axial abutment for the sealing ring is missing in the through-bore for the shaft, this failure or defective functioning leads to an operation-endangering wear up to the total loss of the sealing ring.

It is therefore the object of the present invention to provide a sealing arrangement for the delimitation of a blocking gas space between the shaft and the housing of a fluid flow engine or jet engine in which a wear of the sealing rings endangering the operation is avoided, and which is insensitive to failure or defective functioning of the blocking gas pressure supply.

The underlying problems are solved according to the present invention in that the through-bore for the shaft includes three diameter regions mutually offset by two right angle steps, in that the first step between the small and a middle diameter region is coordinated to the one sealing ring, in that the second step between the middle and a large diameter region is coordinated to the other sealing ring and in that the annular groove for the sealing ring coordinated to the first step is formed between a shoulder of the shaft and a ring adapted to be slipped over the shaft.

The advantages achieved with the present invention reside in particular in that a support at a step of the through-bore for the shaft is also created for the sealing ring on the side of the rotor so that this sealing ring is protected against total wear endangering the operation in case of insufficient blocking gas pressure, in that a non-complicated installation of the sealing arrangement results and in that the sealing arrangement exhibits an improved insensitivity with respect to an alternating blocking gas pressure.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

The single figure is a partial cross-sectional view through a sealing arrangement in accordance with the present invention in a fluid flow engine.

DETAILED DESCRIPTION OF THE DRAWING

Referring now to the single figure of drawing, a sealing arrangement consisting of two sealing places located with an axial spacing is arranged between the shaft 12 carrying at least one rotor 11 and the housing 13 of a fluid flow engine or jet engine of any conventional construction and therefore not shown in detail herein. The shaft 12 runs in oil-lubricated bearings 22. The sealing arrangement is to prevent lubricating oil loss out of the lubricating relief space 23 and the overflow of hot gases out of the rotor space 24 into the lubricating oil relief space 23. Each of the sealing places is formed by a sealing ring 14, 15 which stressed outwardly sealing abuts with its external circumference in a through-bore for the shaft and is guided in an annular groove 18, 19 of the shaft 12.

The sealing rings 14 and 15 delimit a blocking gas space 20 which is acted upon with blocking gas by way of a channel 21.

The sealing ring 14 adjacent the lubricating oil relief space 23 is coordinated in the through-bore for the shaft to a diameter 16 and to a right angle step 26 in the direction to the smaller diameter 25. At the commencement of the operating period of the fluid flow engine, the sealing ring 14 is brought into abutment at the lateral flank 28 of the annular groove 18 opposite the rotor 11 by the excess pressure in the blocking gas space 20. A small axial spacing then exists between the sealing ring 14 and the step 26.

After an initial wear at the sealing ring 14 with respect to the lateral flank 28 of the annular groove 18, the sealing ring 14 is displaced against the right angle step 26 of the through-bore for the shaft. As a result of this axial support, the wear of the sealing ring 14 comes to a standstill.

The sealing ring 15 adjacent the rotor space 24 is coordinated to a diameter 17 in the through-bore for the shaft. The diameter 16 and the diameter 17 are offset with respect to one another by a right angle step 27. During the normal operation of the fluid flow engine, the sealing ring 15 is in equilibrium between the blocking gas pressure and the gas pressure in the rotor space 24. It then does not contact any flank of its annular groove 19 and possesses also a small axial spacing with respect to the step 27. As long as this operating condition prevails, no wear occurs at the sealing ring 15.

If as a result of a failure or defective fuctioning of the blocking gas supply, too low a blocking gas pressure sets in, the axial equilibrium at the sealing ring 15 is disturbed. The now predominating gas pressure in the rotor space 24 displaces the sealing ring 15 axially against the lateral flank 29 of the annular groove 19. As a result thereof, wear commences at the sealing ring 15 with respect to the annular groove 19. As soon as the wear at the sealing ring 15 has reached the difference dimension between the lateral flank 29 of the annular groove 19 and the right angle step 27, the sealing ring 15 is axially supported at the step 27. A further wear at the sealing ring 15 is stopped thereby.

In order that the proposed sealing arrangement can be installed, the annular groove 18 for the sealing ring 14 is formed between a shoulder 30 of the shaft 12 and a ring 31 adapted to be slipped over the shaft 12.

The installation sequence of the sealing arrangement in accordance with the present invention is as follows. The sealing ring 14 is inserted from the rotor space 24 into the coordinated diameter 16 of the through-bore for the shaft. The sealing ring 15 is inserted into the annular groove 19 in the shaft 12. Subsequently, the shaft 12 is introduced into the through-bore for the shaft from the rotor space 24. For threading the sealing ring 15, an inclined surface 32 is provided at the diameter 17. Subsequently, the ring 31 is slipped over the free end of the shaft 12 and the annular groove 18 for the sealing ring 14 is completed thereby. It is appropriate to construct the ring 31 as oil centrifuging ring.

The embodiment illustrated in the drawing of a sealing arrangement according to the present invention can also be arranged between a lubricating relief space and a rotor space at the non-illustrated end of the shaft 12. Matched to the installation sequence, the diameter steps of the shaft through-bore are then to be coordinated correspondingly.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A sealing arrangement between a shaft carrying at least one rotor and a housing of a fluid flow engine, comprising two sealing place means arranged at an axial distance from one another which delimit a blocking gas space means adapted to be acted upon with blocking gas, the sealing place means including two sealing rings disposed about the shaft in annular groove means, the shaft through-bore having three diameter regions mutually offset with respect to one another by two substantially right angle steps, the first step between the small and a middle diameter region being coordinated to one sealing ring, and the second step between the middle and a large diameter region being coordinated to the other sealing ring.

2. A sealing arrangement according to claim 1, wherein the annular groove means for the sealing ring coordinated to the first step is formed between a shoulder of the shaft and a ring means operable to be slipped over the shaft.

3. A sealing arrangement according to claim 2, wherein the ring means is an oil centrifuging ring.

4. A sealing arrangement according to claim 3, wherein the other sealing ring coordinated to the second step is inserted into an annular groove means in the shaft.

5. A sealing arrangement according to claim 1, wherein the other sealing ring coordinated to the second step is inserted into an annular groove means in the shaft.

* * * * *